United States Patent
Takezawa et al.

(10) Patent No.: US 6,682,857 B2
(45) Date of Patent: Jan. 27, 2004

(54) ELECTROLYTE FOR NON-AQUEOUS BATTERIES AND SECONDARY BATTERY USING THE SAME

(75) Inventors: Hideharu Takezawa, Katano (JP); Shoichiro Watanabe, Nara (JP); Shusaku Goto, Moriguchi (JP); Kunio Tsuruta, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 260 days.

(21) Appl. No.: 09/984,159

(22) Filed: Oct. 29, 2001

(65) Prior Publication Data
US 2002/0081497 A1 Jun. 27, 2002

(30) Foreign Application Priority Data
Nov. 1, 2000 (JP) ......................... 2000-335092

(51) Int. Cl.$^7$ .................. H01M 6/14; H01M 6/24
(52) U.S. Cl. ............. 429/345; 429/199; 429/341; 429/332
(58) Field of Search .............. 429/203, 188, 429/341, 344, 345, 199, 332; 252/62.2, 500

(56) References Cited

U.S. PATENT DOCUMENTS

| 5,830,600 A | * | 11/1998 | Narang et al. ............... 429/199 |
| 2003/0003358 A1 | * | 1/2003 | Mandal et al. ............... 429/188 |

FOREIGN PATENT DOCUMENTS

| EP | 1204157 A2 | * 5/2002 | .......... H01M/10/40 |
| JP | 04-184870 | 7/1992 | |
| JP | 08-022839 | 1/1996 | |
| JP | 08-111238 | 4/1996 | |
| JP | 09-180721 | 7/1997 | |
| JP | 10-055819 | 2/1998 | |
| JP | 10-189038 | 7/1998 | |

* cited by examiner

Primary Examiner—Patrick Ryan
Assistant Examiner—Tracy Dove
(74) Attorney, Agent, or Firm—McDermott, Will & Emery

(57) ABSTRACT

The non-aqueous electrolyte-containing secondary battery of the present invention uses a non-aqueous electrolyte including at least one phosphoric ester derivative expressed by Formula (1): $(R^{1a}O)(R^{2a}O)P(O)X$ and by Formula (2): $R(^{1b}O)P(O)X_2$, wherein $R^{1a}$, $R^{2a}$, and $R^{1b}$ independently denote aliphatic hydrocarbon groups having 1 to 12 carbon atoms and X denotes a halogen atom. This arrangement improves the high-temperature storage characteristics after charging and the charge-discharge cycle characteristics of the secondary battery.

6 Claims, 1 Drawing Sheet

ELECTROLYTE FOR NON-AQUEOUS BATTERIES AND SECONDARY BATTERY USING THE SAME

BACKGROUND OF THE INVENTION

The present invention relates to a non-aqueous electrolyte having excellent cycle characteristics, electric capacity, and high-temperature storage properties during charging, as well as a non-aqueous secondary battery using the electrolyte.

A non-aqueous electrolyte-containing secondary battery using an alkaline metal, such as lithium (Li) or sodium (Na), for its negative electrode has a high electromotive force and is expected to have a higher energy density than those of conventional nickel-cadmium storage battery and lead acid battery. Especially there have been extensive studies on the non-aqueous electrolyte-containing secondary battery using Li for the negative electrode.

Application of an alkaline metal for the negative electrode causes dendrite in the process of charging, and the resulting battery is liable to be short-circuited and has low reliability. One proposed technique uses an alloy of Li and aluminum (Al) or lead (Pb) for the negative electrode.

Application of this alloy for the negative electrode causes Li to be stored in the alloy of the negative electrode in the course of charging. This effectively prevents the occurrence of dendrite and gives the battery having higher reliability.

The discharge potential of this alloy is, however, noble by approximately 0.5 V relative to the discharge potential of metal lithium. This leads to a decrease in voltage of the battery by 0.5 V and lowers the energy density of the battery.

The technique of using an intercalation compound of Li and carbon (C) such as graphite for the negative electrode active material has been studied, and the battery based on this technique has been put to practical use under the trade name of lithium ion secondary battery.

No dendrite occurs in the negative electrode of the intercalation compound, since Li enters between the layers of C by charging. The discharge potential of this negative electrode is only slightly noble by approximately 0.1 V relative to the discharge potential of metal lithium. This negative electrode is preferable, because of the less decrease in voltage of the battery.

In the case of graphite, the quantity of Li entering between the layers of C by charging is theoretically only an amount to allow formation of $C_6Li$ at the maximum. The electric capacity under the condition of the maximum quantity of Li is 372 Ah/kg. Carbon materials, diverse alloys, metal oxides and the like having low crystallinity have accordingly been proposed to give the higher capacity than the theoretical value.

With an improvement in capacity and other related performances of the non-aqueous electrolyte-containing secondary battery, the important technical issue has shifted to enhance the stability and the durability in a high-temperature environment of the battery.

Some proposed techniques add a phosphoric ester to the electrolyte from the viewpoint of improving the flame retardant properties and autolysis of the non-aqueous electrolyte-containing secondary battery or especially of the electrolyte and thereby enhancing the stability of the non-aqueous electrolyte-containing secondary battery (for example, JAPANESE PATENT LAID-OPEN PUBLICATION No. 4-184870, No. 8-111238, No. 9-180721, and No. 10-55819). One concrete example is a non-aqueous electrolyte-containing secondary battery, in which a large quantity of a tri-substituted phosphoric ester having a substituent of 4 or less carbon atoms is included in the electrolyte.

Application of an electrolyte containing a large quantity of a general phosphoric ester such as triethyl phosphoric ester improves the stability of the battery, because of the flame retardant properties of the electrolyte.

The phosphoric ester, however, tends to be easily reduced and decomposed on the negative electrode. The type and content of the phosphoric ester may adversely affect the performances of the battery using the phosphoric ester, for example, the energy density, the cycle characteristics, the high-efficiency discharge characteristics, and the high-temperature storage properties. In order to solve this problem, one proposed technique restricts the quantity of a phosphoric ester added to the electrolyte (JAPANESE PATENT LAID-OPEN PUBLICATION No. 8-22839).

The material for the negative electrode having a greater capacity than the carbon material such as graphite has given the non-aqueous electrolyte-containing secondary battery having a large discharge characteristic. The electrode accordingly accumulates the greater quantity of electricity per unit weight or unit volume. With a progress of the charge-discharge cycle, the non-aqueous electrolyte is decomposed to form a passive film on either the positive electrode or the negative electrode, which gradually lowers the discharge capacity.

While the battery is stored in the charged state, the decomposition reaction of the non-aqueous electrolyte arises on either the negative electrode or the positive electrode at high temperatures, because of the high voltage of the battery. There is also deterioration due to the thermal reaction of the non-aqueous electrolyte, which significantly lowers the properties of the battery after storage at high temperatures.

The proposed techniques JAPANESE PATENT LAID-OPEN PUBLICATION No. 8-111238, No. 9-180721 and No. 10-189038 have not actively mentioned the improvement in electrochemical stability of the non-aqueous electrolyte by addition of the phosphoric ester. There has also been no specific discussion on the reactivity of the non-aqueous electrolyte to the positive electrode while the battery is kept at high temperatures. The prior art techniques accordingly have not suggested any countermeasures to solve the above-mentioned drawbacks.

In order to solve the above problems, the inventors of the present invention have intensively studied the phosphoric ester to be included in the non-aqueous electrolyte and have found that application of a non-aqueous electrolyte including a halogen atom-containing phosphoric ester derivative to a non-aqueous secondary battery significantly improves the cycle characteristics and the high-temperature storage characteristics.

The object of the present invention is thus to enhance the electrochemical stability of a non-aqueous electrolyte and suppress a side reaction on either of a positive electrode and a negative electrode by making a phosphoric ester derivative included in the non-aqueous electrolyte.

More specifically, the object of the present invention is to provide an electrolyte for a non-aqueous battery and a non-aqueous secondary battery, which effectively prevents deterioration due to the thermal reaction of the non-aqueous electrolyte, thereby reducing a decrease in discharge capacity with a progress of the charge-discharge cycle and deterioration of the high-temperature storage characteristics.

BRIEF SUMMARY OF THE INVENTION

The present invention is thus directed to an electrolyte for a non-aqueous battery, comprising:

a non-aqueous solvent;

a solute; and at least one selected from the group consisting of phosphoric ester derivatives expressed by Formula (1)

(1)

where $R^{1a}$ and $R^{2a}$ independently denote aliphatic hydrocarbon groups having 1 to 12 carbon atoms and X denotes a halogen atom, and by Formula (2)

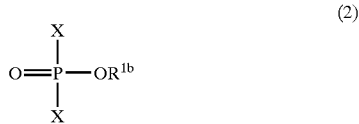
(2)

where $R^{1b}$ denotes an aliphatic hydrocarbon group having 1 to 12 carbon atoms and X denotes a halogen atom.

In Formulae (1) and (2), it is preferable that X represents a fluorine atom.

It is also preferable that the electrolyte contains 0.001 to 10% by weight of the phosphoric ester derivative.

It is further preferable that the non-aqueous solvent comprises a cyclic carbonate and a chain carbonate, and the solute is a Li salt.

The present invention is also directed to a non-aqueous secondary battery comprising a rechargeable (chargeable and dischargeable) positive electrode, a rechargeable negative electrode, and the electrolyte discussed above.

It is preferable that the rechargeable negative electrode contains at least one active material selected from the group consisting of graphite, metal lithium, Li alloys and Li compounds, the alloy and compounds containing at least one of Sn, Si, Al, and In.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
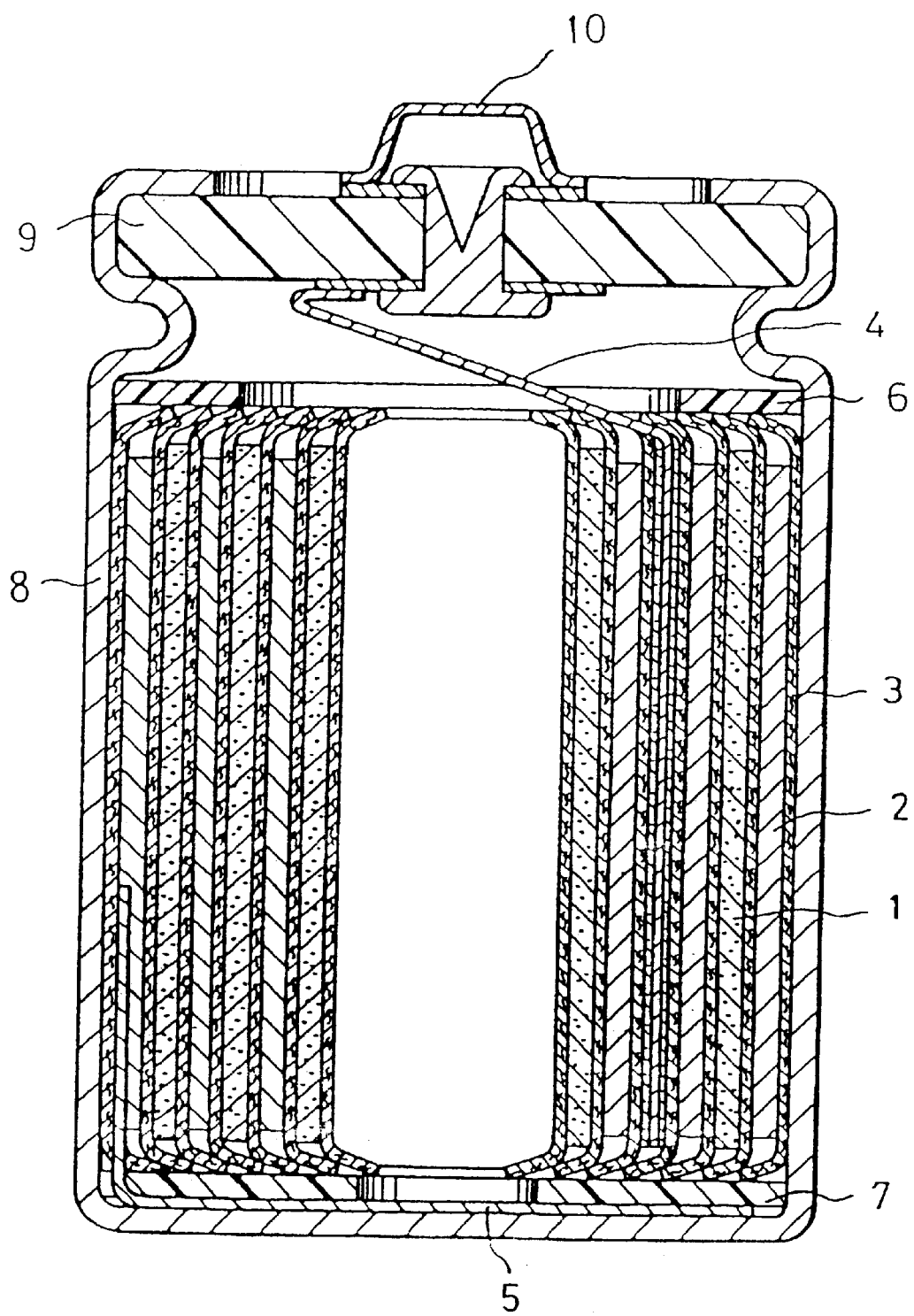
FIG. 1 is a vertical sectional view illustrating the structure of a cylindrical battery manufactured in one embodiment of the present invention.

The main characteristic of the present invention is that the electrolyte for the non-aqueous battery contains at least one selected from the group consisting of phosphoric ester derivatives expressed by Formulae (1) and (2) given above.

In the present invention, especially the introduction of a halogen atom as a substituent group of the phosphoric ester enhances the electrochemical stability of the electrolyte. In addition, according to the present invention, when the battery using such an electrolyte is stored in the charged under a high-temperature environment, the decomposition reaction of the non-aqueous electrolyte can be suppressed particularly on the positive electrode.

Further, by optimizing the chemical structure and the content of the phosphoric ester in the electrolyte, the decomposition reaction of the phosphoric ester on the negative electrode, which has been the problem in the prior art battery, can be suppressed without damaging the electric conductivity of lithium ion. This further prevents a decrease in discharge capacity of the resulting battery with a progress of the charge-discharge cycle, thereby significantly improving the discharge characteristics of the battery after storage at high temperatures.

Typical examples of the aliphatic hydrocarbon groups (residues) having 1 to 12 carbon atoms expressed by $R^{1a}$ and $R^{2a}$ in Formula (1) and by $R^{1b}$ in Formula (2) include linear aliphatic hydrocarbon groups such as methyl group, ethyl group, propyl group, butyl group, pentyl group, hexyl group, heptyl group, oxtyl group, nonyl group, decyl group, undecyl group and dodecyl group, aliphatic hydrocarbon groups having a branched structure such as isopropyl group, tert-butyl group, 2-methylhexyl group and 2-ethylhexyl group, and alicyclic aliphatic hydrocarbon groups.

$R^{1a}$, $R^{2a}$, and $R^{1b}$ may be identical with one another or different from one another.

The halogen atom expressed by X in Formulae (1) and (2) is selected from F, Cl, Br and I. F and Cl are preferable since they can reduce the content of the phosphoric ester in the non-aqueous electrolyte.

Concrete examples of the phosphoric ester derivative expressed by Formula (1) include dimethyl phosphorofluoridate, diethyl phosphorofluoridate, ethyl methyl phosphorofluoridate, dipropyl phosphorofluoridate, diisopropyl phosphorofluoridate, dibutyl phosphorofluoridate, dihexyl phosphorofluoridate, dimethyl phosphorochloridate, diethyl phosphorochloridate, ethyl methyl phosphorochloridate, dipropyl phosphorochloridate, diisopropyl phosphorochloridate, dibutyl phosphorochloridate, and dihexyl phosphorochloridate.

Concrete examples of the phosphoric ester derivative expressed by Formula (2) include methyl phosphorodifluoridate, ethyl phosphorodifluoridate, propyl phosphorodifluoridate, isopropyl phosphorodifluoridate, butyl phosphorodifluoridate, hexyl phosphorodifluoridate, methyl phosphorodichloridate, ethyl phosphorodichloridate, propyl phosphorodichloridate, isopropyl phosphorodichloridate, butyl phosphorodichloridate, and hexyl phosphorodichloridate.

Among the above phosphoric ester derivatives, fluoride atom-containing phosphoric ester derivatives are preferable. The non-aqueous electrolyte may contain only one phosphoric ester derivative. It is, however, preferable that the non-aqueous electrolyte contains two or more phosphoric ester derivatives having different structures because the total content of the phosphoric ester derivatives in the non-aqueous electrolyte can be reduced.

It is preferable that the electrolyte of the present invention contains the phosphoric ester derivative in the range of 0.001 to 10% by weight. If the content of the phosphoric ester is less than 0.001% by weight, chemical and electrochemical stability effects and thermal stability of the non-aqueous electrolyte tend to become insufficient. If the content of the phosphoric ester is greater than 10% by weight, on the other hand, some properties such as ionic conductivity of the non-aqueous electrolyte tends to be damaged and the cycle characteristics and the high-temperature storage characteristics tend to be reduced.

For the higher chemical and electrochemical stability, it is especially preferable that the content of the phosphoric ester derivative ranges 0.001 to 5% by weight.

Known compounds may be used for the non-aqueous solvent in the non-aqueous electrolyte of the present invention. Concrete examples of such known compounds include cyclic carbonates such as propylene carbonate, ethylene carbonate, butylene carbonate and vinylene carbonate, chain carbonates such as dimethyl carbonate, diethyl carbonate, and ethyl methyl carbonate, 1,2-dimethoxyethane, γ-butyrolactone, tetrahydrofuran, 2-methyltetrahydrofuran, dimethyl sulfoxide, dioxolane, 1,3-dioxolane, formamide, dimethylformamide, nitromethane, acetonitrile, methyl formate, methyl acetate, methyl propionate, phosphoric triester, trimethoxymethane, dioxolane derivatives, sulfolane, 3-methyl-2-oxazolidinone, propylene carbonate derivatives, tetrahydrofuran derivatives, diethyl ether, and 1,3-propane saltone. These compounds may be used alone or arbitrarily combined in a specific range that does not damage the effects of the present invention.

The cyclic carbonates and chain carbonates are especially preferable for the non-aqueous solvent included in the non-aqueous electrolyte, since they give the high ionic conductivity in the resulting non-aqueous secondary battery of the present invention.

It is preferable that the cyclic carbonate is at least one selected from the group consisting of ethylene carbonate, propylene carbonate, butylene carbonate and vinylene carbonate. It is also preferable that the chain carbonate is at least one selected from the group consisting of dimethyl carbonate, ethyl methyl carbonate and diethyl carbonate.

The solute (salt) included in the non-aqueous electrolyte may be any of those conventionally used for the non-aqueous batteries, for example, $LiClO_4$, $LiBF_4$, $LiPF_6$, $LiCF_3SO_3$, $LiN(C_2F_5SO_2)_2$, $LiN(CF_3CO_2)_2$, $LiCF_3CO_2$, $LiAsF_6$, $LiSbF_6$, $LiB_{10}Cl_{10}$, lithium salts of lower aliphatic carboxylic acids, $LiAlCl_4$, LiSCN, LiCl, LiBr, LiI, chroroborane lithium, and lithium tetraphenylborate.

These compounds may be used alone or arbitrarily combined in a specific range that does not damage the effects of the present invention. Especially preferable is $LiPF_6$. It is preferable that any of such salts is dissolved in the non-aqueous solvent at the total concentration of 0.5 to 1.5 mol/l.

The secondary battery of the present invention includes the non-aqueous electrolyte discussed above. The constituents other than the electrolyte are not specifically restricted. Any of conventional constituents can be used, although some preferable examples are given below.

A lithium-containing transition metal compound, which can receive lithium ion as the guest, may be used for the active material of the rechargeable positive electrode. Examples of the lithium-containing transition metal compound include $Li_xCoO_2$, $Li_xNiO_2$, $Li_xMnO_2$, $Li_xCo_yLi_{1-y}O_2$, $Li_xCo_yM_{1-y}O_z$, $Li_xNi_{1-y}M_yO_2$, $Li_xMn_2O_4$ and $Li_xMn_{2-y}M_yO_4$, where M denotes at least one selected from the group consisting of Na, Mg, Sc, Y, Mn, Fe, Co, Ni, Cu, Zn, Al, Cr, Pb, Sb and B, x=0 to 1.2, y=0 to 0.9, z=2.0 to 2.3.

Here the value 'x' represents one prior to start of charging or discharging and thus varies by charging or discharging.

Other available examples include transition metal chalcogens, lithium compounds of vanadium oxides, and lithium compounds of niobium oxides. A plurality of different positive electrode active materials may be mixed for use.

The average particle diameter of the positive electrode active material is not specifically restricted but is preferably in the range of 1 to 30 μm.

The positive electrode may be a positive electrode plate obtained by applying a positive electrode mixture comprising a positive electrode active material, a conductive agent and a binder on a current collector.

It is preferable that the rechargeable negative electrode used in the present invention includes at least one selected from the group consisting of carbon, metal lithium, Li alloys and Li compounds, the alloys and compounds containing at least one of Sn, Si, Al and In, as the active material, since they give the large discharge capacity and high voltage.

Examples of the Li alloys include lithium-tin alloys and lithium-silicon alloys, whereas Li compounds include lithium-tin oxides and lithium-silicon oxides.

The negative electrode may be a negative electrode plate obtained by applying a negative electrode mixture comprising a negative electrode active material, a conductive agent, and a binder on a current collector.

The conductive materials used for the positive electrode mixture and the negative electrode mixture are not specifically restricted to those mentioned in Examples below, but may be any electron conductive materials that do not adversely affect the performances of the battery. Available examples include carbon materials such as graphite and low crystalline carbon and carbon materials containing other elements such as B, P, N, S, H or F.

Concrete examples of the binding agent used for the positive electrode include polyacrylic acid, carboxymethylcellulose, polytetrafluoroethylene, polyvinylidene fluoride, vinylidene fluoride-hexafluoropropylene copolymer, polyvinyl alcohol, starch, diacetylcellulose, hydroxypropylcellulose, polyvinyl chloride, polyvinyl pyrrolidone, polyethylene, polypropylene, SBR, EPDM, EPDM sulfonate, fluorinated rubber, polybutadiene, and polyethylene oxide.

Especially preferable are polyvinylidene fluoride, polyvinylidene fluoride-hexafluoropropylene copolymer, polytetrafluoroethylene, polyacrylic acid, carboxymethylcellulose, and SBR. These are also preferable in the structure of the negative electrode.

The current collector of the positive electrode may be composed of aluminum, stainless steel, nickel, titanium, or any of these alloys.

The preferable form of the current collector may be foil, expanded metal sheet, punched metal sheet, or metal net. Especially preferable is aluminum foil.

The current collector of the negative electrode may be composed of copper, stainless steel, nickel, titanium, or any of these alloys.

The preferable form of the current collector for the negative electrode may be foil, expanded metal sheet, punched metal sheet, or metal net. Especially preferable is copper foil.

A separator used in the present invention is required to have a large ionic permeability, a predetermined mechanical strength, insulating ability, absorbing and holding abilities of the electrolyte, and porosity. For example, the separator may be composed of a polymer.

The separator preferably has the function of closing pores at temperatures of not less than a preset level to enhance the resistance. From the viewpoints of the organic solvent resistance and the hydrophobicity, the separator may be a sheet, unwoven fabric, or woven fabric of a single olefin polymer such as polypropylene or polyethylene or a mixture of plural olefin polymers, or a sheet, unwoven fabric, or woven fabric of glass fibers.

The diameter of pores in the separator is preferably in a specific range that does not allow transmission of the positive electrode material, the negative electrode material, the binder, and the conductive agent released from the electrode plate, for example, in the range of 0.01 to 1 µm. The thickness of the separator is generally in the range of 10 to 300 µm. The porosity depends upon the electronic and ionic permeability, the material, and the film pressure, but is preferable in the range of 30 to 80% in general.

The battery may be constructed by mixing the positive electrode mixture and the negative electrode mixture with a polymer material that absorbs and holds an organic electrolyte composed of a solvent and a lithium salt dissolved in the solvent and by integrating a porous separator composed of a polymer that absorbs and holds the organic electrolyte with the positive electrode and the negative electrode. The polymer material is required to absorb and hold the organic electrolyte, and an especially preferable example is vinylidene fluoride-hexafluoropropylene copolymer.

The shape of the battery may be coin-shaped, button-shaped, sheet, laminate, cylinder, flat, cubic, rectangular parallelepiped or the like. The battery may be a large-sized battery mounted on, for example, electric vehicles.

The non-aqueous electrolyte-containing secondary battery of the present invention may be used, for example, portable information terminals, portable electronic appliances, small-sized power storage apparatuses for domestic use, motorcycles, electric vehicles, and hybrid vehicles, although application is not restricted to these examples.

Here, FIG. 1 is a vertical sectional view illustrating the structure of a cylindrical non-aqueous electrolyte-containing secondary battery according to the present invention. The secondary battery shown in FIG. 1 is manufactured according to the following procedure. In first, a finely porous polypropylene separator 3 having a greater width than both electrode plates is interposed between a positive electrode plate 1 having a positive electrode lead 4, which is fixed by spot welding and is composed of the same material as the core material, and a negative electrode plate 2 having a negative electrode lead 5 to form a laminate. Then, the laminate is wound in a spiral form to obtain an electrode body.

Subsequently, polypropylene insulators 6 and 7 are arranged above and below the electrode body to obtain an assembly and the assembly is inserted in a battery case 8 and a step is formed on the upper portion of the battery case 8. Then, the non-aqueous electrolyte is poured into the battery case 8, and one charge-discharge cycle is carried out while the top of the battery case 8 is kept in the open state to release a gas produced by the reaction. And, the battery case 8 is sealed with a sealing plate 9 having a positive electrode terminal 10.

The present invention is concretely described below with some examples, although the present invention is not restricted to such examples. The description first regards the method of evaluating the batteries manufactured in Examples and Comparative Examples given below.

(1) Charge-Discharge Cycle Test

Each of the batteries manufactured in Examples and Comparative Examples is iteratively subjected to the charge-discharge cycle, by charging the battery to 4.2 V and discharging it to 3 V with a constant current of 50 mA at 20° C. The discharge capacity at the 1st cycle and the discharge capacity at the 100th cycle are measured. The capacity maintenance rate is calculated from the observed values according to Equation (3) given below:

$$\text{Capacity maintenance rate (\%) at 100th cycle} = 100 \times (\text{discharge capacity at 100th cycle/discharge capacity at 1st cycle}) \quad (3)$$

(2) High-Temperature Holding Test

Each of the batteries manufactured in Examples and Comparative Examples is iteratively subjected to 10 charge-discharge cycles, where each cycle charges the battery to 4.2 V and discharges it to 3 V with a constant current of 50 mA at 20° C. After 11th charge, the battery is stored at 85° C. for 7 days.

The battery is then cooled down to 20° C. and discharged to 3V, and the discharge capacity (discharge capacity at the 11th cycle) is measured. Further, the battery charged to 4.2 V and discharged to 3 V, and the discharge capacity (discharge capacity at the 12th cycle) is measured. The capacity maintenance rate after storage at high temperature is calculated from the observed values according to Equation (4) given below:

$$\text{Capacity maintenance rate (\%) after storage at high temps.} = 100 \times (\text{discharge capacity at 11th cycle/discharge capacity at 10th cycle}) \quad (4)$$

The capacity recovery rate was then calculated according to equation (5) given below:

$$\text{Capacity recovery rate (\%)} = 100 \times (\text{discharge capacity at 12th cycle/discharge capacity at 10th cycle}) \quad (5)$$

EXAMPLES 1 TO 16

100 Gram of graphite power as the negative electrode active material was mixed with 5 g of styrene-butadiene rubber as the binder and a petroleum solvent was added thereto, followed by stirring to obtain a paste. The paste was applied on a copper core member, and the core member was dried with the paste at 120° C., rolled and cut to give a negative electrode plate containing 2.5 g of carbon powder. The discharge capacity of the carbon powder was 350 mAh/g.

Then, 100 g of $LiCoO_2$ classified to 100 mesh or less as the positive electrode active material was mixed with 5 g of carbon powder as the conductive agent and 8 g of polytetrafluoroethylene as the binder, and a petroleum solvent was added thereto, followed by stirring to obtain a paste. The paste was applied on a titanium core member, and the core member was dried with the paste, rolled and cut to give a positive electrode plate containing 5 g of the positive electrode active material.

Further, $LPF_6$ was dissolved in an equal volume solution mixture of ethylene carbonate and ethyl methyl carbonate to obtain 1 mol/l $LiPF_6$ solution. Each of phosphorofluoridates and phosphorochloridates shown in Table 1 was added to the $LiPF_6$ solution followed by stirring to give 14 different non-aqueous electrolytes containing 1% by weight of the phosphorofluoridate or phosphorochloridate.

The negative electrode plate, the positive electrode plate and the diverse non-aqueous electrolytes were assembled into cylindrical non-aqueous electrolyte-containing secondary batteries shown in FIG. 1. The volume of the non-aqueous electrolyte was 2.6 ml.

The results of the charge-discharge cycle test and the high-temperature storage test of the respective batteries are shown in Table 1.

COMPARATIVE EXAMPLE 1

The battery of Comparative Example 1 was assembled according to the same procedure as that of Example 1, except that none of the phosphorofluoridates and phosphorochloridates was added to the non-aqueous electrolyte. The results of the charge-discharge cycle test and the high-temperature storage test of Comparative Example 1 are also shown in Table 1.

COMPARATIVE EXAMPLE 2

The battery of Comparative Example 2 was assembled according to the same procedure as that of Example 1, except that the non-aqueous electrolyte contained 1% by weight of trimethyl phosphorate. The results of the charge-discharge cycle test and the high-temperature storage test of Comparative Example 2 are also shown in Table 1.

TABLE 1

| | Phosphoric ester derivatives | Capacity maintenance rate (%) | | Capacity recovery rate (%) |
|---|---|---|---|---|
| | | At 100th cycle | After storage at high temps | |
| Ex. 1 | Dimethyl phosphorofluoridate | 95 | 87 | 86 |
| Ex. 2 | Diethyl phosphorofluoridate | 94 | 85 | 85 |
| Ex. 3 | Ethyl methyl phosphorofluoridate | 95 | 88 | 89 |
| Ex. 4 | Dipropyl phosphorofluoridate | 95 | 85 | 84 |
| Ex. 5 | Dibutyl phosphorofluoridate | 93 | 84 | 83 |
| Ex. 6 | Dihexyl phosphorofluoridate | 94 | 83 | 83 |
| Ex. 7 | Dodecyl phosphorofluoridate | 93 | 82 | 84 |
| Ex. 8 | Methyl phosphorodifluoridate | 93 | 83 | 84 |
| Ex. 9 | Ethyl phosphorodifluoridate | 94 | 83 | 83 |
| Ex. 10 | Hexyl phosphorodifluoridate | 89 | 80 | 81 |
| Ex. 11 | Dodecyl phosphorodifluoridate | 88 | 83 | 82 |
| Ex. 12 | Dimethyl phosphorochloridate | 89 | 80 | 78 |
| Ex. 13 | Diethyl phosphorochloridate | 89 | 80 | 77 |
| Ex. 14 | Dihexyl phosphorochloridate | 90 | 79 | 78 |
| Ex. 15 | Methyl phosphorodichloridate | 89 | 78 | 77 |
| Ex. 16 | Ethyl phosphorodichloridate | 90 | 79 | 78 |
| Com. Ex. 1 | — | 65 | 50 | 52 |
| Com. Ex. 2 | Trimethyl phosphorate | 63 | 52 | 54 |

The results in Table 1 shows that the batteries of the respective Examples, where any of the phosphorofluoridates and phosphorochloridates was added to the non-aqueous electrolyte, had significantly improved capacity maintenance rate at the 100th cycle, capacity maintenance rate after storage at high temperatures, and capacity recovery rate after storage at high temperatures, compared with the battery of Comparative Example 1, where none of the phosphorofluoridates and phosphorochloridates was added to the electrolyte. This proves that the phosphorofluoridates and phosphorochloridates have effects of suppressing a decrease in capacity.

Compared with the battery of Comparative Example 2 including trimethyl phosphorate, the batteries of the respective Examples have significantly improved capacity maintenance rate at the 100th cycle, capacity maintenance rate after storage at high temperatures, and capacity recovery rate after storage at high temperatures. Addition of any of the phosphorofluoridates and phosphorochloridates to the non-aqueous electrolyte enhances the electrochemical stability of the non-aqueous electrolyte and thereby suppresses the decomposition reaction of the non-aqueous electrolyte on either the positive electrode or the negative electrode in the charged state. Similar results are obtained in the range of the carbon atoms of 1 to 12, irrespective of the substituent.

Similar tendency was observed for the aliphatic hydrocarbon groups having the branched structure and unsaturated aliphatic hydrocarbon groups.

EXAMPLES 17 TO 20

In these examples, ethyl methyl phosphorofluoridate, methyl phosphorodifluoridate, ethyl methyl phosphorochloridate and ethyl phosphorodichloridate were added respectively to the non-aqueous electrolyte to make the concentration of 1% by weight, and the batteries were assembled according to the same procedure as that of Example 1. The batteries were stored at high temperatures and evaluated under the same conditions as those of Example 1, while the charging voltage was varied from 4.1 V, 4.15 V or 4.2 V. The results of the charge-discharge cycle test and the high-temperature storage test of the respective batteries are shown in Table 2.

COMPARATIVE EXAMPLE 3

The battery of Comparative Example 3 was assembled according to the same procedure as that of Example 17, except that none of ethyl methyl phosphorofluoridate, methyl phosphorodifluoridate, ethyl methyl phosphorochloridate, and ethyl phosphorodichloridate was added to the non-aqueous electrolyte. The results of the charge-discharge cycle test and the high-temperature storage test of Comparative Example 3 are also shown in Table 2.

TABLE 2

| | Charging voltage prior to storage at high temperatures | Capacity maintenance rate (%) | | | Capacity recovery rate (%) | | |
|---|---|---|---|---|---|---|---|
| | | 4.1 V | 4.15 V | 4.2 V | 4.1 V | 4.15 V | 4.2 V |
| Ex. 17 | Ethyl methyl phosphorofluoridate | 98 | 92 | 88 | 90 | 89 | 89 |
| Ex. 18 | Methyl phosphorodifluoridate | 98 | 92 | 83 | 90 | 89 | 84 |
| Ex. 19 | Ethyl methyl phosphorochloridate | 93 | 88 | 83 | 86 | 85 | 82 |
| Ex. 20 | Ethyl phosphorodichloridate | 93 | 88 | 79 | 86 | 85 | 78 |
| Com. Ex. 3 | — | 77 | 67 | 50 | 65 | 57 | 52 |

Table 2 shows that the batteries of the respective Examples, where ethyl methyl phosphorofluoridate, methyl phosphorodifluoridate, ethyl methyl phosphorochloridate, and ethyl phosphorodichloridate were respectively added to the non-aqueous electrolyte, have significantly improved capacity maintenance rate and capacity recovery rate after storage at high temperatures at the charging voltages of 4.1 V, 4.15 V, and 4.2 V, compared with the battery of Comparative Example 3, where none of the phosphoric ester derivatives was added.

This proves that ethyl methyl phosphorofluoridate, methyl phosphorodifluoridate, ethyl methyl phosphorochloridate, and ethyl phosphorodichloridate have effects of suppressing a decrease in capacity.

It is thought that addition of the phosphoric ester derivative to the non-aqueous electrolyte enhances the electrochemical stability of the non-aqueous electrolyte, suppresses the decomposition reaction of the non-aqueous electrolyte on either the positive electrode or the negative electrode, and forms a passive film to relieve deterioration of the active materials. Phosphoric ester derivatives other than those mentioned above had the similar effects.

EXAMPLES 21 TO 28

The batteries were assembled according to the same procedure as that of Example 1, except that the content of ethyl methyl phosphorofluoridate in the non-aqueous electrolyte was varied in the range of 0.0005 to 20% by weight, and evaluated at the charging voltage of 4.2 V. The results of the charge-discharge cycle test and the high-temperature storage test of the respective batteries are shown in Table 3.

TABLE 3

| | Content of ethyl methyl phosphorofluoridate | Capacity maintenance rate (%) | | Capacity recovery rate (%) |
|---|---|---|---|---|
| | | At 100th cycle | After storage at high temps. | |
| Ex. 21 | 0.0005 | 51 | 60 | 64 |
| Ex. 22 | 0.001 | 85 | 82 | 84 |
| Ex. 23 | 0.01 | 86 | 82 | 85 |
| Ex. 24 | 0.5 | 91 | 85 | 88 |
| Ex. 25 | 1 | 95 | 85 | 88 |
| Ex. 26 | 5 | 88 | 81 | 86 |
| Ex. 27 | 10 | 83 | 80 | 84 |
| Ex. 28 | 20 | 55 | 60 | 67 |
| Com. Ex. 1 | — | 65 | 50 | 52 |

Table 3 shows that the batteries have high capacity maintenance rate at the 100th cycle, high capacity maintenance rate after storage at high temperatures and high capacity recovery rate after storage at high temperatures when the content of ethyl methyl phosphorofluoridate in the non-aqueous electrolyte is in the range of 0.001 to 10% by weight.

The content of lower than 0.001% by weight does not exert the sufficient effects of suppressing the reaction of the non-aqueous electrolyte with the positive electrode or the negative electrode in the charging state and of enhancing the electrochemical stability of the non-aqueous electrolyte. The content of greater than 10% by weight, on the other hand, damages the ionic conductivity of the non-aqueous electrolyte. Phosphoric ester derivatives other than those mentioned above had similar results.

EXAMPLES 29 TO 33

The batteries were assembled according to the same procedure as that of Example 1, except that two of phosphorofluoridates and phosphorodifluoridates shown in Table 4 were added, by 0.2% by weight each, to the non-aqueous electrolyte, and the assembled batteries were evaluated at the charging voltage of 4.2 V. The results of the charge-discharge cycle test and the high-temperature storage test of the respective batteries are shown in Table 4.

TABLE 4

| | Phosphoric ester derivatives | Capacity maintenance rate (%) | | Capacity recovery rate (%) |
|---|---|---|---|---|
| | | At 100th cycle | After storage at high temps. | |
| Ex. 29 | Dimethyl phosphorofluoridate Diethyl phosphorofluoridate | 93 | 83 | 84 |
| Ex. 30 | Dimethyl phosphorofluoridate Ethyl methyl phosphorofluoridate | 94 | 81 | 83 |
| Ex. 31 | Diethyl phosphorofluoridate Ethyl methyl phosphorofluoridate | 92 | 83 | 82 |
| Ex. 32 | Methyl phosphorodifluoridate Ethyl phosphorodifluoridate | 94 | 82 | 83 |
| Ex. 33 | Methyl phosphorofluoridate Eethyl phosphorodifluoridate | 93 | 84 | 83 |
| Ex. 1 | Dimethyl phosphorofluoridate | 95 | 87 | 86 |

Table 4 shows that addition of two of the phosphorofluoridates and phosphorodifluoridates to the non-aqueous electrolyte attained high capacity maintenance rate at the $100^{th}$ cycle, high capacity maintenance rate after storage at high temperatures, and high capacity recovery rate after storage at high temperatures by the less content than the content of a single phosphorofluoridate.

It is thought that addition of the two phosphoric ester derivatives having different structures exerts the greater effects of suppressing the reaction of the non-aqueous electrolyte with the positive electrode or the negative electrode in the charging state and of enhancing the electrochemical stability of the non-aqueous electrolyte, compared with addition of a single phosphoric ester derivative.

The two phosphoric ester derivatives are not restricted to the above examples. Addition of three or more phosphoric ester derivatives having different structures led to the similar results.

As described above, the present invention gives the non-aqueous electrolyte-containing secondary battery, which has the high energy density and effectively reduces a decrease in discharge capacity of the battery with a progress of the charge-discharge cycle and deterioration of the properties of the battery after storage at high temperatures.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrolyte for a non-aqueous battery, comprising:
   a non-aqueous solvent;
   a solute; and
   at least one selected from the group consisting of phosphoric ester derivatives expressed by Formula (1)

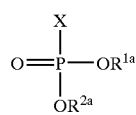

(1)

where $R^{1a}$ and $R^{2a}$ independently denote aliphatic hydrocarbon groups having 1 to 12 carbon atoms and X denotes a halogen atom, and by Formula (2)

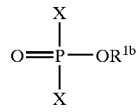

(2)

where $R^{1b}$ denotes an aliphatic hydrocarbon group having 1 to 12 carbon atoms and X denotes a halogen atom.

2. The electrolyte for a non-aqueous battery in accordance with claim 1, wherein X represents a fluorine atom.

3. The electrolyte for a non-aqueous battery in accordance with claim 1, wherein said electrolyte contains 0.001 to 10% by weight of said phosphoric ester derivative.

4. The electrolyte for a non-aqueous battery in accordance with claim 1, wherein said non-aqueous solvent comprises a cyclic carbonate and a chain carbonate, and said solute is a Li salt.

5. A non-aqueous secondary battery comprising a rechargeable positive electrode, a rechargeable negative electrode, and said electrolyte in accordance with claim 1.

6. The non-aqueous secondary battery in accordance with claim 5, wherein said rechargeable negative electrode comprises at least one active material selected from the group consisting of graphite, metal lithium, Li alloys and Li compounds, said alloys and compounds containing at least one of Sn, Si, Al and In.

* * * * *